July 22, 1952 — J. BARSANO — 2,604,113
VALVE
Filed Feb. 16, 1946
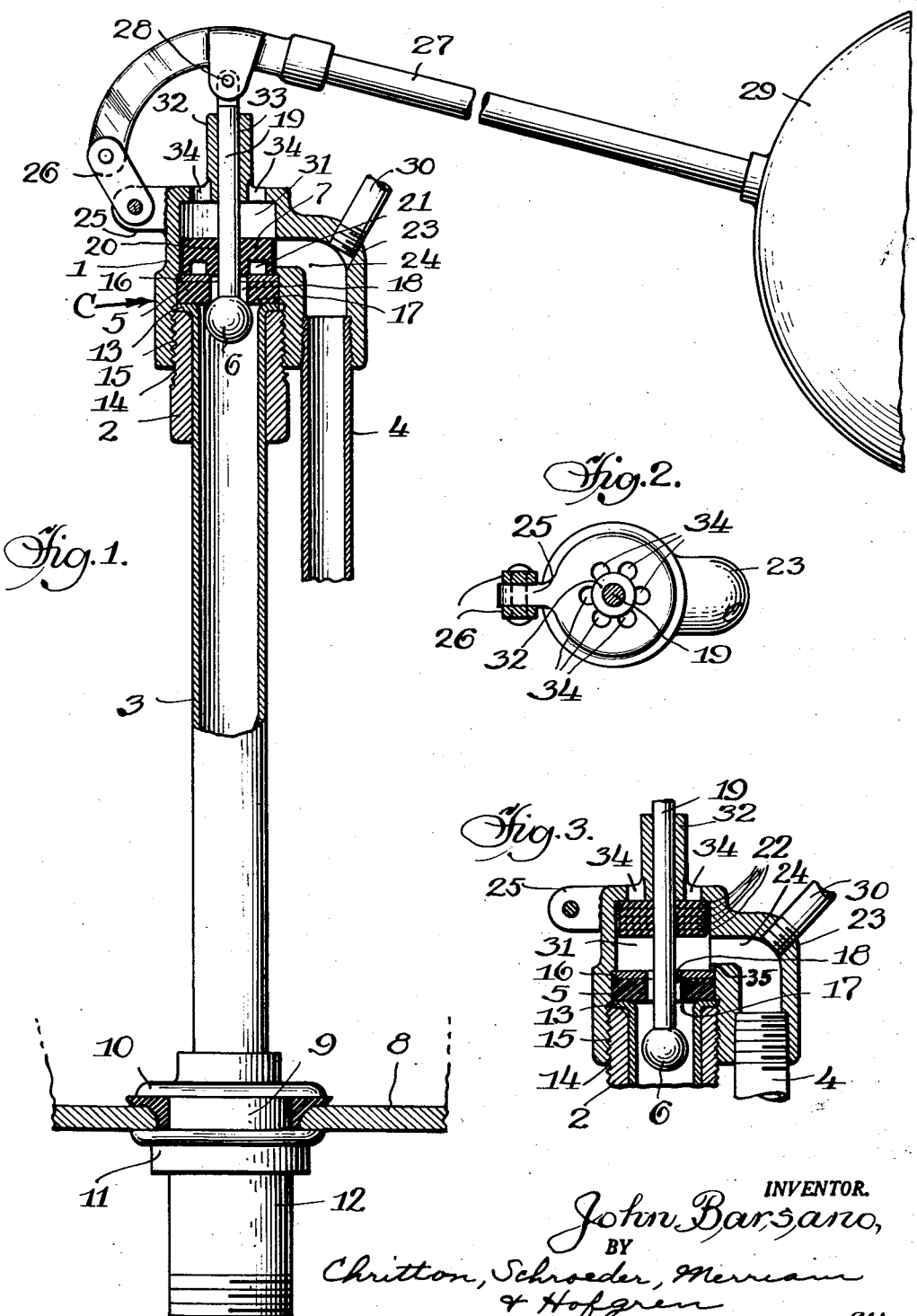
INVENTOR.
John Barsano,
BY
Chitton, Schroeder, Merriam & Hofgren
Attys.

Patented July 22, 1952

2,604,113

UNITED STATES PATENT OFFICE 2,604,113

VALVE

John Barsano, Chicago, Ill., assignor to Barcy Manufacturing Company, Chicago, Ill., a corporation of Illinois Application February 16, 1946, Serial No. 648,052

5 Claims. (Cl. 137—218)

This invention relates to a valve and more particularly a valve having a syphon breaker to prevent the liquid within a flush tank or other container from being withdrawn therefrom by suction into the city water mains.

As is known, city water mains sometimes, due to unusual conditions such as a fire in the neighborhood and other causes, have a suction created therein which tends to withdraw thereinto the water from bathroom flush tanks and other containers receiving their supply from the city mains. Such occurrence would create a health hazard if the water so withdrawn should contain any material that would be damaging to the health of persons drinking water obtained from such water mains. The valve of the present invention overcomes the above disadvantage as well as providing an improved valve construction.

Among the objects of the present invention are: to provide a noval and improved valve construction; to provide a valve construction that is economical to manufacture, easy to assemble and install, pleasing in appearance, readily accessible for repairs and replacements, and one that safeguards the health of others using the same city water mains; to provide a valve having an inlet opening closed by a ball from below, and having a lightweight washer above said opening to permit inflow of water from the source of supply when the latter is operating under positive pressure, and prevent flow in the opposite direction when the source of supply is temporarily subjected to suction; and such further objects, advantages and capabilities, inherently possessed by my invention, as will later more fully appear.

My invention further resides in the combination, construction and arrangement of parts illustrated in the accompanying drawing, and while I have shown therein a preferred embodiment, I wish it understood that the same is susceptible of modification and change without departing from the spirit of my invention.

In the drawings:

Fig. 1 is a vertical central longitudinal section through a valve construction embodying my invention, parts being shown in elevation, and the tank, float and discharge pipe being shown fragmentarily, with the valve in closed position.

Fig. 2 is a top plan view of the casing.

Fig. 3 is a fragmentary vertical central section of the casing and contained parts, showing the valve in open position, and with a modified form of the syphon breaker washer.

The present invention is an improvement of the valve shown and described in my copending application Serial No. 556,695 filed October 2, 1944 and now abandoned. In the form of my invention, shown for illustrative purposes in the drawing, my improved valve construction comprises a casing C having an upper part 1 and a lower part 2, said casing having an inlet pipe 3, an outlet pipe 4, and mounted within the casing is a stationary valve seat 5, a movable ball valve 6 and a movable syphon breaker washer 7. The inlet pipe 3 is at its lower end mounted in the bottom 8 of a conventional flush tank, where it is provided with any suitable sealing means such as the beveled rubber washer 9 clamped against the edges of the hole by the threaded clamping parts 10 and 11, and from which the connecting pipe 12 extends downwardly.

The upper end of the inlet pipe 3 is formed with a flange 13 which seats upon the upper end of the lower part 2 of the casing, which lower part is formed with exterior threads 14 to engage with complemental interior threads 15 formed in the upper part 1 of the casing. Mounted on the upper side of the flange 13 is the valve seat member 5 which has fixed on its upper side face an annular ring 16 of metal or other hard material. The valve seat member 5 is formed of rubber or other soft material which yields when the ball valve 6 contacts the lower edge 17 thereof when this valve is moved upwardly thereagainst. The valve seat member is formed with a central hole 18 of smaller diameter than the inside of the inlet pipe 3 and of larger diameter than the valve stem 19 to the lower end of which stem the ball valve is fixed, so that when this ball valve is open, water or other liquid may flow upwardly around the ball and through hole 18.

The syphon breaker washer 7 has a central axial opening 20 through which the valve stem 19 slidably extends, so that this washer may seat against the plate 16 of the valve seat member 5 when the valve is closed, and move upwardly away therefrom when the valve is open and water flowing therethrough. The washer 7 is preferably made of a lightweight material so that when the valve is opened the washer will quickly and easily move upwardly off of the valve seat member under the force of the inflowing water, and yet heavy enough to readily seat itself upon the valve seat member upon closing of the valve. I have found Bakelite to be very successful as a material for this washer, but wish it understood that other plastic material, or other lightweight material may be used for this purpose if desired. In Fig. 1 the washer is shown as being of one integral piece with an annular groove 21 formed in its bottom face to assist in quickly moving it upwardly under action of the incoming water, and in Fig. 3 the washer is shown as formed of a plurality of disks 22 of Bakelite or other suitable material which are fixed together by any suitable adhesive or other fastening means and omitting the groove in the bottom face.

The casing C is formed on one side with the enlarged portion 23 having an outwardly and downwardly extending opening 24 within the bottom end of which is screwed the outlet pipe 4 which extends any desired distance downwardly in the flush tank. Extending laterally from the casing C, and preferably on the opposite side from the enlarged portion 23, is a lug 25 to which is pivotally mounted a pair of links 26 which at their upper ends are pivotally connected to the end of the float lever 27. The float lever is pivotally connected at 28 to the upper end of the valve stem 19 and at its free end carries the float 29 which floats on the water in the flush tank and controls the opening and closing of the ball valve 6. The enlarged portion 23 is formed with a threaded opening to receive the overflow pipe 30.

The upper part 1 of the casing is of sufficient height to provide for the cavity 31 above the washer 7 to enable this washer to have sufficient movement therein to move clear of the inner end of the outlet opening 24 when the ball valve is open, and to move back and rest upon the valve seat member when the valve is closed. The casing at its top is formed with an upstanding central projection 32 having a bore 33 which slidably receives the valve stem to properly guide the same in its movements. Also formed in the casing top are one or more openings 34 connecting the cavity 31 with the air in the upper portion of the flush tank above the water level. As seen in Fig. 1, the flange 13 of the inlet standpipe 3, and the valve seat member consisting of the valve seat 5 and the annular disk 16, are clamped together between the top of the lower casing part 2 and the interior shoulder 35 of the upper casing part 1 by screwing these casing parts toward each other. Also these casing parts may be unscrewed to give access to the interior elements of the valve construction for repair, replacement and the like, when desired. The parts of my valve construction, except where otherwise stated, will preferably be formed of brass or other noncorrodible metal so as to resist deterioration from water and moisture.

In the operation of my device the ball valve will open when the float 29 descends as the water level lowers, which will admit water from the city main through the inlet pipes 12 and 3. This incoming water will, immediately upon passing through the central opening in the valve seat member, force the washer 7 upwardly against the flat inner face of the casing top and close openings 34 and simultaneously be clear of the inner end of the outlet opening 24. Water will then pass through outlet pipe 4 into the flush tank until the water level raises sufficiently to close valve 6. The washer 7 will then fall by gravity upon the flat upper face of the valve seat member disk 16.

Should a suction be created in the city water main, due to a fire in the neighborhood or for any other cause, which suction would tend to open valve 6 and suck liquid from the tank into the city main by syphonic action, this would be completely prevented by washer 7 being firmly seated upon disk 16 of the valve seat member by such suction. Also, at the same time, any syphonic action would be instantly broken up by the entry of outside air through the holes 34 into the cavity 31, above the washer 7, within the casing. Under normal conditions, when the valve is open, and water being passed into the interior of the tank, the washer 7 will be in its uppermost position, closing the holes 34 and preventing water from being sprayed therethrough. It is thus seen that I have provided means for normal operations of my valve, and at the same time have eliminated all possibility of contaminated liquid passing from the tank into the city water mains. Conventional tripping means, not shown, may be used for effecting the normal discharge of the liquid from the tank.

I claim:

1. A valve mechanism for flush tanks and the like, comprising a casing having an upper part and a lower part detachably secured thereto, an inlet pipe adapted to be seated at its bottom portion to the bottom of the tank and having a flange at its upper end, an apertured valve seat member seated on said flange, said upper part of the casing having an annular shoulder seated against the upper edge of the valve seat member, means on said casing parts for moving them axially of each other to detachably clamp said flange and valve seat member together, said upper part having an axial opening, a valve stem slidable in said axial opening, a ball valve fixed on said stem for movement to and away from the lower side of the valve seat member, said upper part having an outlet opening, and a cavity above the valve seat member, a lightweight washer around said stem and movable in said cavity to and away from the upper side of the valve, said upper part having an additional opening in its top in communication with both the cavity and the space outside of the casing, whereby the washer being so constructed and arranged relative to said additional opening and the aperture in the valve seat that the washer will be lifted off of the valve seat member and close said additional opening when the valve is open to admit liquid through the valve seat member, and to be seated on the valve seat member and open the additional opening when any suction exists in the inlet pipe, the opening of the additional opening breaking any suction and syphon action in the cavity when liquid is not being forced inwardly through the inlet pipe.

2. A valve mechanism for flush tanks, comprising, a separable two-part casing having a lower part provided with an inlet opening, and an upper part provided with an outlet opening in one side thereof, an apertured valve seat member removably clamped between the two parts of the casing, the upper part of the casing having an axial opening in its upper end, a valve stem slidably mounted in said axial opening and extending through the aperture in the valve seat member, a ball valve fixed to the lower end of the valve stem, the lower portion of the valve seat member around its aperture being of resilient material to yieldably seat the ball valve thereagainst under upward pressure of liquid thereagainst when the valve is in its upper position and pass liquid through the valve seat member when the valve is moved downwardly from its seat, float means for imparting longitudinal movement to the stem to seat and unseat the valve to and from its seat, said casing having a cavity above the valve seat member, said outlet opening joining one side of said cavity, a washer surrounding said stem and movable in the cavity toward and away from the valve seat member, said washer being of a diameter approximately that of the cavity except to enable axial movement of the washer in the cavity.

3. Valve mechanism as claimed in claim 2, in which said washer is made of lightweight material, and the upper side of the upper part of the casing is formed with a vertical opening other than said axial opening through which the valve stem slides, to be covered to prevent spray when the washer is in its uppermost position, and to be opened to break any vacuum in the cavity when the washer is seated on the valve seat member, the top and bottom surfaces of the washer being flat.

4. A valve mechanism for flush tanks, comprising, a casing having an inlet opening, an apertured valve seat member in said casing, the casing having an axial opening in its upper end, a valve stem slidably mounted in said axial opening, a ball valve fixed to the lower end portion of the stem for movement to and away from the lower surface of the valve seat member, float means for imparting longitudinal movement to the stem to seat and unseat the valve with relation to the valve seat member, said casing having a cavity above the valve seat member, said casing also having an outlet opening joining one side of said cavity, and a flat-faced washer surrounding the valve stem and movable in the cavity toward and away from the valve seat member, said washer being of a horizontal cross-section approximately that of the cavity except to enable axial movement of the washer in the cavity, the top wall of said cavity having a vent opening to prevent vacuum formation in the cavity when the washer is down and prevent spray when the washer is up.

5. A valve mechanism for flush tanks and the like, comprising a casing having an upper part and a lower part detachably secured thereto, an inlet pipe connected with said lower part, an apertured valve-seat member, said upper part of the casing having an annular shoulder seated against the upper edge of the valve seat member, means on said casing parts for moving them axially of each other to detachably clamp said valve seat member between said upper and lower parts of the casing, said upper part having an axial opening, a valve stem slidable in said axial opening, a ball valve fixed on said stem for movement to and away from the lower side of the valve seat member, said upper part having an outlet opening, and a cavity above the valve seat member, a lightweight washer around said stem and movable in said cavity to and away from the upper side of the valve seat member, said upper part having an additional opening in its top in communication with both the cavity and the space outside of the casing, the washer being so constructed and arranged relative to said additional opening and the aperture in the valve seat member that the washer will be lifted off of the valve seat member and close said additional opening when the valve is open to admit liquid through the valve seat member, and to be seated on the valve seat member and open the additional opening when any suction exists in the inlet pipe, the opening of the additional opening breaking any suction and syphon action in the cavity when liquid is not being forced inwardly through the inlet pipe.

JOHN BARSANO.

REFERENCES CITED

The following references are of record in the file of this patent:

UNITED STATES PATENTS

| Number | Name | Date |
|--------|------|------|
| 818,185 | Minton | Apr. 17, 1906 |
| 1,167,743 | Conrad | Jan. 11, 1916 |
| 1,167,776 | Minekime | Jan. 11, 1916 |
| 1,903,816 | Hanson | Apr. 18, 1933 |
| 1,953,130 | Prellwitz | Apr. 3, 1934 |
| 2,153,904 | Wilson | Apr. 11, 1939 |
| 2,264,902 | Hill | Dec. 2, 1941 |
| 2,270,910 | Scirsky | Jan. 27, 1942 |
| 2,290,145 | Owens | July 14, 1942 |
| 2,395,906 | Owens | Mar. 5, 1946 |